(12) United States Patent
Asciutto

(10) Patent No.: US 8,955,248 B2
(45) Date of Patent: Feb. 17, 2015

(54) BURROWING VERMIN EXTERMINATOR

(76) Inventor: Joseph S. Asciutto, El Cajon, CA (US)

(*) Notice: Subject to any disclaimer, the term of this patent is extended or adjusted under 35 U.S.C. 154(b) by 0 days.

(21) Appl. No.: 13/454,413

(22) Filed: Apr. 24, 2012

(65) Prior Publication Data

US 2012/0266521 A1    Oct. 25, 2012

Related U.S. Application Data

(60) Provisional application No. 61/478,820, filed on Apr. 25, 2011.

(51) Int. Cl.
*A01M 13/00* (2006.01)
*A01M 17/00* (2006.01)

(52) U.S. Cl.
CPC ............ *A01M 13/006* (2013.01); *A01M 17/004* (2013.01)
USPC .................................. 43/127; 43/125; 43/124

(58) Field of Classification Search
CPC . A01M 13/00; A01M 13/006; A01M 17/004; A01M 17/00
USPC ..................... 43/124, 125, 127, 129
See application file for complete search history.

(56) References Cited

U.S. PATENT DOCUMENTS

| | | | | |
|---|---|---|---|---|
| 192,905 A | * | 7/1877 | Dreyer | 43/127 |
| 724,305 A | * | 3/1903 | Macfarland | 43/127 |
| 1,290,544 A | * | 1/1919 | Graumann | 43/124 |
| 1,309,193 A | * | 7/1919 | Garrison | 43/127 |
| 1,400,598 A | * | 12/1921 | Fowler | 43/129 |
| 1,401,292 A | * | 12/1921 | Van Meter | 43/124 |
| 1,419,653 A | * | 6/1922 | Van Meter | 43/124 |
| 1,492,732 A | * | 5/1924 | Knopf | 43/124 |
| 1,558,892 A | * | 10/1925 | Kennington et al. | 43/125 |
| 1,562,902 A | * | 11/1925 | Metzger et al. | 43/129 |
| 1,775,703 A | * | 9/1930 | Stokes | 43/129 |
| 1,872,676 A | * | 8/1932 | Castonguay | 43/127 |
| 1,930,588 A | * | 10/1933 | Edward | 43/127 |
| 2,467,922 A | * | 4/1949 | Woytal et al. | 43/125 |
| 2,755,968 A | * | 7/1956 | Fiant | 43/124 |
| 2,851,818 A | * | 9/1958 | Matheny | 43/129 |
| 2,906,056 A | * | 9/1959 | Youngblood | 43/124 |
| 3,017,121 A | * | 1/1962 | Carlson | 239/129 |
| 3,239,960 A | * | 3/1966 | Stevens | 43/129 |
| 3,242,098 A | * | 3/1966 | Andrews | 43/129 |
| 3,249,553 A | * | 5/1966 | Steinberg | 43/127 |
| 3,382,603 A | * | 5/1968 | Oberto | 43/129 |
| 3,900,983 A | * | 8/1975 | Petrosky | 43/58 |
| 3,982,351 A | * | 9/1976 | Waldron | 43/129 |
| 3,986,670 A | * | 10/1976 | Syveson | 43/129 |

(Continued)

FOREIGN PATENT DOCUMENTS

| | | | | |
|---|---|---|---|---|
| CH | 637807 A5 | * | 8/1983 | ............ A01M 13/00 |
| GB | 1017820 A | * | 1/1966 | ............ A01M 13/00 |
| GB | 2213379 A | * | 8/1989 | ............ A61L 9/03 |

*Primary Examiner* — Darren W Ark
(74) *Attorney, Agent, or Firm* — Donn K. Harms

(57) ABSTRACT

A device for the extermination of burrowing vermin is disclosed. The device is configured as a plenum chamber having an intake adapted for sealed communication with the exhaust of an internal combustion engine. An outflow conduit communicates between the plenum chamber and a burrow entrance for vermin such as gophers. Heat and gas under pressure from the engine is communicated through the outflow conduit to the burrow along with any fumes from heated liquid or solids deposited to the plenum chamber to rid the burrow of any subterranean occupants.

18 Claims, 4 Drawing Sheets

(56) References Cited

U.S. PATENT DOCUMENTS

| | | | | |
|---|---|---|---|---|
| 4,026,330 A * | 5/1977 | Dunn | | 43/124 |
| 4,173,094 A * | 11/1979 | Nichols, Jr. | | 43/129 |
| 4,240,802 A * | 12/1980 | Nichols, Jr. | | 43/129 |
| 4,823,505 A * | 4/1989 | Jackson | | 43/124 |
| 4,829,706 A * | 5/1989 | Perry | | 43/127 |
| 4,906,032 A * | 3/1990 | Hohman | | 285/319 |
| 5,058,312 A * | 10/1991 | Jackson | | 43/124 |
| 5,109,628 A * | 5/1992 | Ellefson | | 43/125 |
| 5,109,629 A * | 5/1992 | King et al. | | 43/124 |
| 5,154,018 A * | 10/1992 | Livingston | | 43/125 |
| 5,282,334 A * | 2/1994 | Kimura et al. | | 43/125 |
| 5,548,921 A * | 8/1996 | Kleisath | | 43/124 |
| 5,588,252 A * | 12/1996 | Jones | | 43/125 |
| 5,700,039 A * | 12/1997 | Manning | | 43/125 |
| 6,026,609 A * | 2/2000 | Rawls | | 43/124 |
| 6,279,261 B1 * | 8/2001 | Binker et al. | | 43/125 |
| 7,249,437 B2 * | 7/2007 | Stout | | 43/124 |
| 7,581,349 B2 * | 9/2009 | Hurlburt | | 43/125 |
| 7,617,630 B2 * | 11/2009 | Holmes | | 43/124 |
| 8,800,200 B1 * | 8/2014 | Williams et al. | | 43/127 |
| 2008/0178518 A1 * | 7/2008 | Reece | | 43/127 |
| 2009/0313882 A1 * | 12/2009 | Hurlburt | | 43/125 |
| 2011/0197495 A1 * | 8/2011 | Shaw | | 43/125 |
| 2011/0277373 A1 * | 11/2011 | Robbins | | 43/125 |
| 2013/0091757 A1 * | 4/2013 | da Costa | | 43/125 |

* cited by examiner

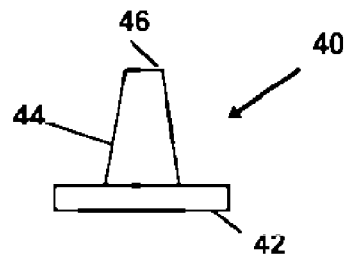
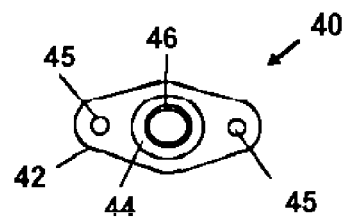
FIG. 6    FIG. 7
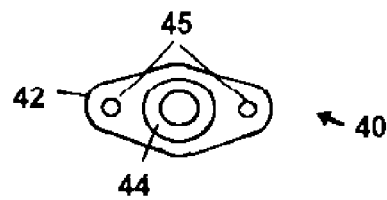
FIG. 8
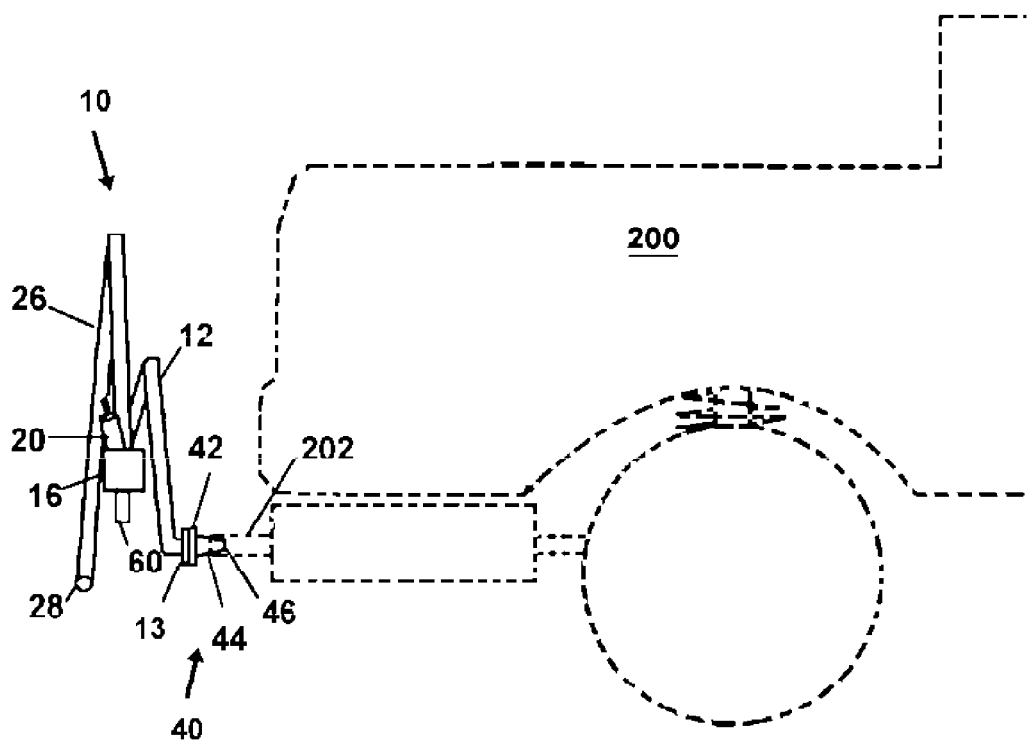
FIG. 9

BURROWING VERMIN EXTERMINATOR

This application claims priority to U.S. Provisional Patent Application No. 61/478,820 filed on Apr. 25, 2011, and included herein in its entirety by this reference.

BACKGROUND OF THE INVENTION

1. Field of the Invention

The present invention relates to burrowing vermin extermination devices and more particularly, to an extermination device which is removably or otherwise engageable to an internal combustion engine for employment of heat and exhaust gasses communicated therefrom, to a burrow as an economical and efficient means for burrowing pest extermination.

2. Prior Art

There are many types of burrowing pests which dig and occupy tunnels and burrows. While decades in the past, such animals often had their populations naturally controlled by predators, modernly they have adapted to live and burrow in areas where few such predators exist. The result has been an explosion in the population and problems associated with such burrowing animals. Gophers are a well known burrowing pest and are similar to most such animals. The term gopher as it is commonly used does not relate to any one species, but is a generic term used to describe any of several small burrowing rodents endemic to North America, including the pocket gopher (family Geomyidae), also called true gophers, and the ground squirrel, including Richardson's ground squirrel and the species of prairie dog.

Gophers in this group of burrowing animals can vary in size and often weigh around 0.5 pounds (230 g), and are about 15 inches (38 cm) long in body length, with a tail 7 inches (18 cm) long. They are well adapted to living underground in tunnels.

Consequently, gophers and similar burrowing vermin dig tunnels and subterranean chambers, and are associated with the rodent order. There are over one hundred kinds of gophers in America which because of their burrowing, can disrupt human plans like commercial agriculture, garden plots, landscaping, and even underground cables. Their penchant for digging and their exploding population caused by lack of predators, has led to their frequent treatment as pests.

Gophers create a large community of tunnels with large mounds of dirt and rocks at their entrances, sometimes referred to as gopher towns. In some species, burrowing rodents will frequently stand watch at the entrance to a tunnel and whistle when predators are spotted, causing all the other gophers to run for the safety of the tunnels. A gopher town can easily spread to take over large sections of yards, gardens, and meadows, and may have a population from dozens to hundreds depending on the territory. The resulting destruction of plant life will then leave the area a stretch of denuded dirt.

As a consequence of the exploding populations, many exterminating techniques for burrowing vermin such as gophers have evolved. Many modern techniques involve the application of poisonous chemicals, smoke, or gasses being introduced into the burrow in efforts to kill the inhabitants. U.S. Pat. No. 5,548,921 to Kleisath teaches a method and apparatus for gassing gophers, comprising a device for introducing dry chlorine material and water into a burrow. The combination of dry chlorine and water produces chlorine gas for effective poisoning of the gopher. However, for the average consumer, the use and handling of poisonous materials may not be desirable, especially if they have children. Further, the employment of such chemicals often leaves residual toxins in the soil long after use.

U.S. Pat. No. 7,249,437 to Stout teaches a method and apparatus for exterminating burrowing pests where a first agent is introduced into the burrow to destabilize the pest, followed by a second agent for killing them. The method of Stout effectively administers a lethal dose of poison before the animal can escape or hide within the burrow. Although providing an effective means to exterminate burrowing pests, the method and apparatus does not seem economically viable for the average consumer.

U.S. Pat. No. 4,829,706 to Perry teaches an apparatus for introducing the poisonous exhaust gasses of a two cycle engine into a burrow. The device includes a bowl shaped exhaust shroud for placing over a burrow entrance and directing the exhaust gasses. However, the smoke produced and level of toxicity of the exhaust gasses is limited to what the engine can burn and may not be suitable for reliable extermination.

As such there is a continuing and unmet need for an improved device for directing communicating gasses under pressure into the long tunnels of a burrow. In order to eliminate the need to purchase specialized equipment, such a device should be easily engageable to a conventional internal combustion engine through a communication with the exhaust pipe, stand alone small engine or employing in combination with a car, or motorcycle, or other wheeled vehicle having an internal combustion engine. Such a device would be rendered portable and easily positionable for communication of heated gas to burrow entry points.

SUMMARY OF THE INVENTION

The device herein disclosed and described provides a solution to the shortcomings in prior art and achieves the above noted goals through the provision of an engagement or header system configured to engage with the gas exhaust port or exhaust system of an internal combustion engine. When engaged to the engine exhaust port, the device can double as an engine muffler to dampen the noise produced by the engine. The device generally includes an intake conduit or pipe, a smoke generating or plenum chamber with a sealable access for adding oil or other substances, an exhaust conduit or pipe, and an exhaust hose or flexible tube for communication between the exhaust conduit and a burrow.

In a particularly preferred mode, the intake pipe of the device includes means for engagement of the axial conduit within the intake pipe, to a conventional engine exhaust port, much the same as an exhaust manifold to an engine as is commonly known in the art, via a bolt-on type of engagement. In other particularly preferred modes, the device may be operatively engaged to the terminating end of the exhaust pipe of an existing internal combustion engine such as on a car or piece of equipment, providing there is sufficient heat in the exhausting gasses at the exhaust pipe terminating end.

Such engines are conventionally found on vehicles such as, but not limited to, passenger vehicles, tractors, lawn mowers, generators, motorcycles, and similar vehicles. In another particularly preferred mode, the device is engageable to an engine exhaust pipe at the terminating tail pipe end via a means for engagement such as a plug-in or slide-on type engagement. This allows the device to be easily retrofit to an available exhaust pipe of an available internal combustion engine by the user without the need for permanently altering existing vehicle engine and exhaust components. Such employment is preferably made employable on engines where there is sufficient heat in the exhaust gas exiting the exhaust port to vaporize or burn oil in the device's plenum chamber.

In yet another particularly preferred mode, the device may be engaged at an intermediate position along an exhaust pipe between the engine head and the distal end of the tail pipe. This position is desirable since exhaust gasses are normally hotter before passing completely through a tail pipe. In this mode the device would employ a switch interface, such as a three-way valve, to operatively re-direct the heated exhaust to the intake pipe of the device from the conventional route toward the tailpipe.

In all the particularly preferred modes in use, the device is operatively engaged to an internal combustion engine by some means of substantially sealed engagement of the device intake, to an exhaust gas output. The device thus takes advantage of existing engines the user may have to generate the heat and conduit pressure to communicate gasses to the intended burrow.

Once the device is in operative communication with exiting exhaust gasses from an engine, the exhaust heat from the engine is directed under engine-generated pressure, into the axial conduit of an intake pipe of the device which communicates with a plenum chamber of the device. The plenum chamber provides a means to concentrate the exhaust smoke, and/or allow injection or imparting of a means to generate smoke in combination with exhaust gas heat. Such a means to generate smoke or gas is provided by employment of any substance which when mixed with heated exhaust gases, will create smoke and create a gaseous mixture of elevated toxicity to more quickly cause the death of vermin breathing the mixture. Let it be noted that the terms, 'toxic', 'toxic smoke', 'toxic gas', and 'toxic mixture' can refer to a mixture of gasses that when breathed by the intended vermin will cause death or alternatively can mean exhaust gas mixed with a gasified poison, such as cyanide for instance, which when breathed by the intended vermin will cause a lethal extermination.

Furthermore, the fill portion or aperture of the plenum chamber provides a means to introduce additional liquid or solid to generate smoke or fumes in combination with exhaust gasses, such as oil, into the plenum chamber. The oil may be petroleum or other oils such as motor oil, or any oil or other liquid or solid material which reacts with the heat of exhaust to act as a smoke producing substance. Most oils for instance will be heated sufficiently to change from a liquid to a gaseous state by combination of the liquid oil which contacts both the hot surface of the plenum chamber wall, and the hot exhaust gasses within the chamber. Alternatively, a supply of carbon dioxide which will gasify and augment the exhaust can be employed such as highly concentrated carbon dioxide of dry ice. Such dry ice can be deposited within the plenum chamber where hot gasses from the exhaust will melt it and carry the highly concentrated carbon dioxide to the burrow along with the exhaust gas.

The moving exhaust gasses through the plenum chamber exhaust the mixture from the device as a highly concentrated toxic exhaust and smoke mixture. For instance, a user may continually introduce oil or other liquid which turns gaseous when exposed to exhaust heat into the plenum chamber as needed to provide a specific toxicity of the mixture and is advantageous over prior art devices of this nature.

The toxic smoke mixture exits the plenum chamber and is communicated under pressure from the incoming exhaust from the internal combustion engine, through the exhaust conduit of the device exiting the plenum chamber, to an exhaust hose or tube in a sealed engagement therewith.

The exhaust hose or tube is employed to communicate the gas and smoke mixture, between the exit port of the exhaust conduit of the device, and an entrance hole of an underground burrow. As long as the internal combustion engine is running and supplying and pressurizing the gas supplied to the device herein, the exhaust gasses exiting the device under that pressure, are pumped into the burrow upon successive cycles of the engine. This allows communication of the exhaust gasses and any smoke mixed therein, such that they saturate the air supply at the far reaches of the burrow and any adjoined tunnels.

The toxic mixture, especially at elevated toxicity as provided via oil or other fluid or gassifable solids introduced into the plenum chamber, effectively asphyxiates and/or exterminates the pest within the burrow and leaves no residual toxic chemical within the soil as is commonly associated with other poisoning means known in the art.

It is additionally particularly preferred that the exhaust hose include a means for sealing the hose with a burrow entrance such as a stopper plate engaged at or near the distal terminating end of the hose. In use, the distal end of the hose is inserted into the burrow entrance while the stopper plate provides a means to limit the amount of hose that can be introduced into the burrow, i.e. only the remaining distal portion of the hose from the stopper plate to the terminating end is introduced into the burrow.

The distal end of the hose is preferably a rigid member such that the distal end does not pinch or bind within the burrow entrance. The stopper plate additionally provides a seal around the burrow entrance upon inserting the distal portion and the user may pack dirt or other debris over the top surface and perimeter of the stopper plate to further seal the entrance. As noted above, the employment of dry ice to generate highly concentrated carbon dioxide is employable herewith, and because such melts to a gas at lower temperatures than liquids such as oil, a supply of dry ice may be positionable closer to the engagement to the burrow. An aperture to insert the dry ice in the hose in contact with the gas supply would provide a means to include such in the exhaust gas communicated to the burrow without having to deposit it in the plenum chamber.

With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention.

It is an object of the invention to provide a burrowing vermin extermination device which is easy to use, cost effective, long lasting, durable and leaves no residual toxicity within the environment.

It is an object of the invention to provide a burrowing vermin extermination device that is configured for engagement to an existing internal combustion engine so as to eliminate the need to purchase smoke and heat generation equipment.

It is an object of the invention to provide a burrowing vermin extermination device which provides a heated passage as a means to introduce oil or other toxic smoke producing substances into fluid flow of heated exhaust flowing through the system.

It is still another object of the invention to provide a means to form a sealed communication between the flow of gas from the device, and the entrance to the burrow and underlying tunnels system to aid in flowing the gas through the system.

BRIEF DESCRIPTION OF DRAWING FIGURES

FIG. 6 shows a front view of an adapter for the device for engagement to the tailpipe of a vehicle.

FIG. 7 shows a top view of the adapter.

FIG. 8 shows a bottom view of the adapter.

FIG. 9 is a side view of the device another particularly preferred mode employing the adapter for engagement to the tailpipe of a vehicle.

DETAILED DESCRIPTION OF THE PREFERRED EMBODIMENTS OF THE INVENTION

Figure 1:
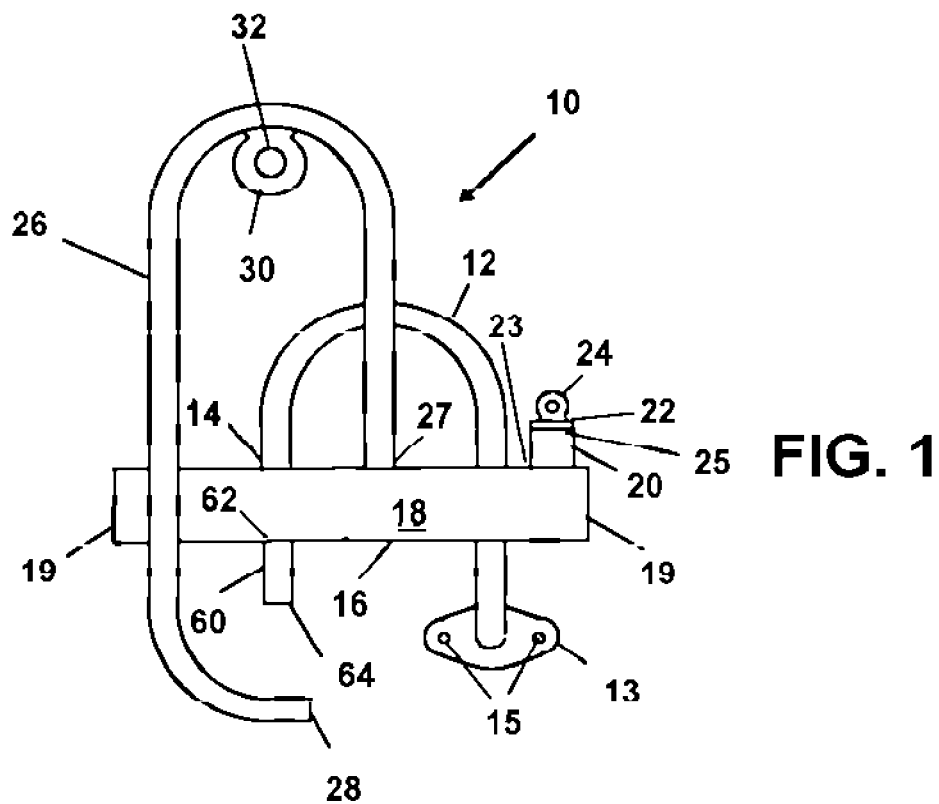
FIG. 1 shows front view of the device.
Figure 2:
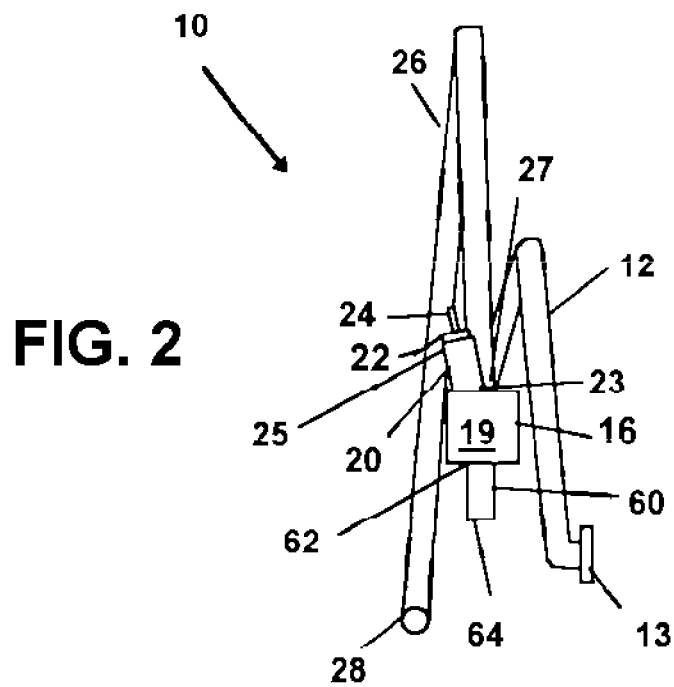
FIG. 2 is a side view of the device.

Now referring to drawings in FIGS. 1-11, wherein similar components are identified by like reference numerals, there is seen in FIG. 1 and FIG. 2 front and side views of the burrowing vermin extermination device 10 herein. The device 10 includes an intake aperture communicating with an axial conduit for receiving pressurized exhaust from an engine such as the depicted intake pipe 12. The intake pipe 12 is best formed of metal such as steel to maintain heat internally in its axial cavity, or of similar heat retaining and resistant material. The axial cavity of the intake pipe 12 communicates from the first end having a flange 13 for engagement to an engine exhaust port to a sealed communication of the axial cavity at a second end 14 with the internal cavity within the surrounding walls forming the plenum chamber 16.

In the mode of FIG. 1-2, the first end flange 13 provides a means for sealed engagement to an engine exhaust port, such as the depicted plate with one or a plurality of apertures 15 for operative bolt-type engagement to an engine exhaust port as is known commonly in the art. This engagement provides a sealed intake means to receive the exhaust gases from the internal combustion engine.

The second end 14 of the intake pipe 12 preferably extends generally in an inverted U-shaped fashion to allow extra length of the pipe and axial conduit therein, without enlarging the overall length and girth of the device 10. This U-shape above the upper surface of the plenum chamber also provides a means to prevent liquid or other material deposited in the plenum chamber 16 from being communicated back toward the engine.

The second end 14 terminates at a sealed engagement of the axial conduit of the intake pipe 12, with the plenum chamber 16 by a means of engagement such as welding or bolt-type. Sealed engagement of the intake pipe 12 to the plenum chamber 16 allows exhaust gasses to pass through the axial cavity of the intake pipe 12 and directly into the plenum chamber 16 without leaking.

The plenum chamber 16 is an enclosed chamber defined by one or a plurality of side walls 18 extending between capped ends 19. In use the plenum chamber 16 provides a means to concentrate exhaust gasses, and to enhance them, for communication and use as a toxic substance for exterminating and/or asphyxiating vermin.

The plenum chamber 16 is equipped with a filler access 20 including a removably engaged filler access cap 22. The filler access 20 is formed as a tube and extends from a first end 23 to a second end 25 where the access cap 22 engages. The first end 23 in sealed engagement to the plenum chamber 16 providing a conduit for communication into the enclosure of the plenum chamber 16 from the second end 25, to allow a user to introduce oil, liquid, gassifiable solids such as dry ice, or other toxic substances into the chamber 16 for combination with the entering exhaust gas.

Briefly stated, the hot exhaust gasses entering the plenum chamber 16 heat the oil or other gassifiable substance introduced into the chamber 16 to a gaseous state producing an enhanced toxic gaseous mixture. The operative means of employment of the device 10 for vermin removal and related features will become apparent upon further disclosure of at least one particularly preferred as used mode set forth shortly in FIGS. 3,9 and 10.

Additionally engaged to the plenum chamber 16 is the sump pipe 60 having an internal cavity including a first end 62 and a second end 64. The first end 62 of the sump pipe 60 engages the plenum chamber to place its internal cavity in sealed engagement to the plenum chamber 16 preferably inline with the second end 14 of the intake pipe 12. The second end 64 is capped defining an enclosed internal cavity of the sump pipe 60.

During operative employment of the device 10 the internal cavity of the sump pipe 60, aligned with the intake pipe 12, provides a low spot or "sump" directly under the incoming hot exhaust gas exiting the intake pipe 12 under pressure into the plenum chamber 16. This incoming gas heats the plenum chamber 16 and sump pipe 60 and communicates hot gasses directly into the axial internal cavity of the sump pipe 60.

The heated plenum chamber 16 and hot walls thereof, causes the oil or other substance communicated into the plenum chamber 16 to heat faster and to make smoke almost immediately. The fluid or heat induced smoke producing substance communicated into the internal cavity of the sump pipe 60 is also heated by its wall surface and especially from the direct contact of the entering hot exhaust gas from the intake.

The sump pipe 60 internal cavity serves as a reservoir to attract by gravity, and hold the liquid or other heat induced smoke producing material deposited to the plenum chamber 16 which does not boil or turn to smoke immediately upon entry. The reservoir also holds fluid or material not immediately turned to smoke or gas to allow such a conversion over time.

As noted, it is preferred that the cavity within the pipe forming the sump 60 should be lower than the plenum chamber 16 with the device 10 upright as in FIG. 1, to provide a gravity induced means to collect any excess fluid therein for a timed cooking to smoke. However, the sump 60 may be formed of alternative construction and/or location while still providing reasonably improved utility as outlined above and should not be considered limiting by the figure.

The device 10 further includes an exhaust pipe 26 having an axial passage communicating between a first end 27 and a second end 28. The first end 27 is in sealed engagement of the axial cavity with the plenum chamber 16 by a means of sealed engagement in a manner to allow fluid (smoke) to pass from the chamber 16 and to the axial cavity of the exhaust pipe 26 when in use. The means of sealed engagement of the first end 27 of the exhaust pipe 26 to the chamber 16 may be welding, bolt type, or the like. The exhaust pipe 26 preferably extends generally in an inverted U-shaped fashion above the upper surface of the plenum chamber with the device 10 in the as-used position of FIG. 1, from the first end 27 to the second end 28 which purpose will become apparent shortly.

Figure 3:
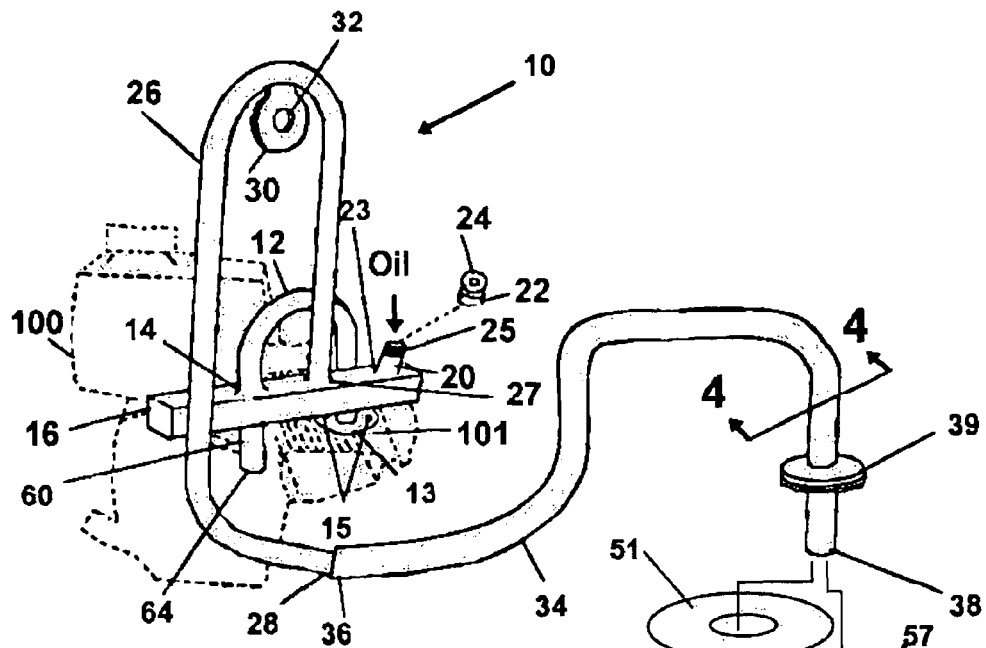
FIG. 3 is an elevated view in a particularly preferred as used mode engaged to an stand alone small engine.

FIG. 3 shows an elevated view of the device 10 in a particularly preferred as-used mode as in FIG. 1. In this mode the device 10 is also configured to function as an engine 100 muffler. The flange 13 or other means of sealed engagement at the first end of the intake pipe 12 is operatively engaged to the exhaust port 101 of the engine 100. The means of engagement may be bolt type engagement via the holes 15 of the first end flange 13 as is commonly known in the art.

In use, as the engine 100 is started and while running, it produces hot exhaust gasses. The gasses are directed via the axial conduit of the intake pipe 12 into the plenum chamber 16 and directed toward the sump pipe 60. The introduction of hot gasses into the plenum chamber 16 of the device 10 provides a means to heat oil, liquid, or solids which turn to gas or smoke when exposed to heat, or similar smoke producing substance which has been introduced into the plenum chamber 16 via the filler access 20.

In use, the filler access cap 22 is temporarily removed to allow combination to the enclosure of the plenum chamber 16. The user will simply add the desired amount of oil, liquid, or solids into the chamber 16. Additionally, the user is permitted to continually add more heat induced gas producing substances as needed, or while the engine is running.

As the typically hot gasses of the engine exhaust enter the plenum chamber 16 and are directed toward the cavity in the sump 60, the added oil or heat activated substance is heated and cooked or boiled and gassified, and toxic smoke is produced for combination with the exhaust gas. The engine 100 fuel may be gasoline, diesel, propane, vegetable oil, or fuel burning type of the like that produces exhaust gasses of a temperature to effectively heat oil or similar smoke producing substance to a gaseous state. There is seen a great advantage over prior art in that the disclosed invention can burn clean, non ground polluting vegetable oil, and therefore is more suitable for use in environmentally sensitive areas.

It is an advantage of the present invention to allow a user to continuously add oil or other heat induced smoke producing substances into the plenum chamber 16 via the filler access 20 as needed for effective vermin extermination. Furthermore the elevated position of the inverted U-shaped intake pipe 12 provides a means to prevent any liquid oil or similar liquid substance from entering and possibly damaging the engine such as from over-filling of oil into the plenum chamber 16 or accidental tipping of the device 10.

During operation the intake pipe 12, plenum chamber 16, and filler access 20 will heat to a temperature determined by the spent hot exhaust gasses expelled from the engine 100. As such it is preferred in the device herein, to provide a means to disperse heat from the filler access cap 22 to allow a user to grasp the cap 22 during operation. This may be a heat sink 24 such as a substantially planar protrusion 24 engaged to the cap 22 or similar heat sink means known in the art. The means of engagement of the filler access cap 22 to the filler access 20 may be thread type on the second end 25 or any other means for sealed removable engagement known in the art.

Once the desired toxicity of smoke is obtained, the exhaust smoke communicates from the plenum chamber 16 to the axial passage of the exhaust pipe 26. The depicted elongated extension of the exhaust pipe 26 provides a means to cool the exhaust gasses due to the added exposure of the exhaust pipe 26 to the ambient environment, similar to a heat sink. In that manner, heat will dissipate from the exhaust gasses to the exhaust pipe, and ultimately into the ambient air. The lowered temperature of the gas mixture achieved provides for safer handling and employment of the device 10 by a user.

However, it must be noted that a conventional heat shield (not shown) may additionally be employed as needed for safety reasons. Furthermore, the inverted U-shaped extension of the exhaust pipe 26 is preferred as a means to prevent unburnt oil or material deposited into the plenum chamber from passing from the chamber 16 through the exhaust pipe 26 and ultimately to the environment.

It is additionally preferred that in all particularly preferred modes of the device 10 disclosed that there is further included an exhaust hose 34 or tube. The exhaust hose 34 includes an axial passage communicating from a first end 36 to a second end 38. There is additionally included a substantially planar hose-surrounding stopper plate 39 circumferentially engaged about the hose 34 at or near the second end 38. The first end 36 is generally engaged to the terminating second end 28 of the exhaust pipe 26 by a means of removable engagement. The exhaust hose 34 is preferably flexible, wear resistant, and heat resistant material as to allow the user to position the hose 34 as needed to a burrow entrance.

However, the second end 38 and stopper plate 39 are preferably metal such as steel as to ensure no pinching or binding of the distal end of the hose once inserted into a burrow. In this fashion the second end 38 and stopper 39 may be a metal fitting which is engaged to the end of the flexible hose 34.

Figure 4:
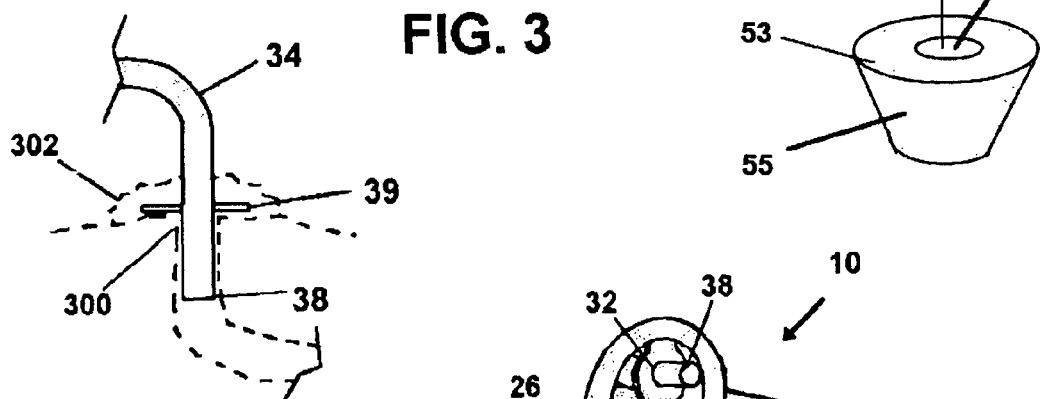
FIG. 4 is a cross sectional view of the distal end of the exhaust hose engaged within the entrance of a burrow.

The stopper plate 39 provides a means to seal the burrow entrance 300 when engaging the distal end 38 therein, as shown in cross sectional depiction in FIG. 4. The stopper plate 39 also provides a means to limit the distance the exhaust hose 34 can enter a burrow 300 to prevent it from getting stuck, while providing a seated sealed engagement with the entrance 300. Furthermore, added utility is found in that a user may pack dirt 302 or other debris over the rear of the stopper plate 39 to form an additional seal of the entrance 300.

The sealing component for the distal end 38 of the hose can also include a kit of sealing components to mate with and enhance the sealed engagement of the distal to the burrow entrance 300. Further, such a kit of components can provide mating components to allow lengths of hose to be added as needed to extend the exhaust hose 34 to hard to reach places. As shown, an enlarged diameter secondary plate 51 and cicumfrential tapering interface 53 provide enhanced means for initial engagement and sealed engagement with the entrance 300. The secondary plate 51 would be of a diameter 2-3 times larger than the diameter of the stopper plate 39 and have an aperture therein sized smaller than the diameter of the stopper plate 39. This allows the stopper plate 39 to seat on the upper surface of the secondary plate 51 and lets the device seal with larger burrow holes.

The tapering interface 53 provides a tapered sidewall 55 for engagement in a projection into the burrow entrance 300 and a planar top surface configured for sealed engagement against the stopper plate 39. The axial passage 57 through the tapering interface 53 communicates the gas into the burrow. The device 10 may include the secondary plate 51 and tapered interface 53 and stopper plate 39 in a kit of sealing components so the user may choose the component yielding the best seal to the particular burrow entrance 300.

Figure 5:
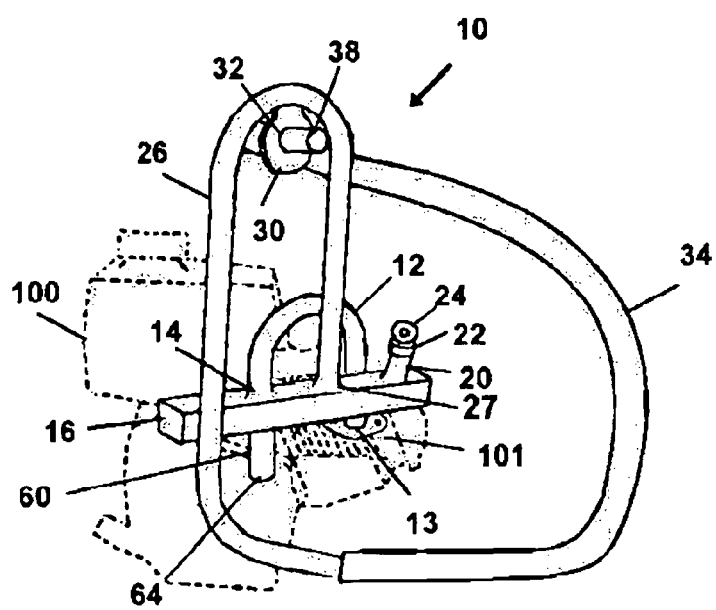
FIG. 5 is an elevated view of the device with the exhaust hose in a stored position.

As seen in FIG. 5 the device 10 includes a hose storage portion 30 with an aperture 32 engaged to the exhaust pipe 26. The storage portion 30 is preferable provided at an elevated position relative the terminating second end 28 of the exhaust pipe 26. In this manner the distal second end 38 of the hose 34 can be secured similarly elevated to provide an additional means to ensure no unburnt oil reaches the environment in case of accidental tipping or the like. Further, it is noted that the user can essentially engage or rest the distal end 38 at any elevated position, for example a car tailgate that happens to be close by.

In another particularly preferred mode of the present invention the device 10 may include an adapter 40 for operative sealed engagement to the tailpipe of a vehicle, providing there is sufficient heat. FIG. 6 shows a side view of the adapter 40 generally defined by a base 42 and frusto-conical or circumferentially tapering pipe portion 44 with a distal end 46. Top and bottom view can be seen in FIG. 7 and FIG. 8 respectively. The base 42 provides a means to engaged to the first end 13 of the intake pipe 12 of the device 10. Clearance holes 45 of the base 42 of the adapter 40 will generally coaxially align to the clearance holes 15 of the manifold first end 13 for bolt type engagement.

Shown in FIG. 9 is the as used mode of the device 10 employing the adapter 40. The distal end 46 of the frusto-conical pipe portion 44 is engaged into the terminating end of the tailpipe 202 of a vehicle 200 via frictional engagement. The frusto-conical portion 44 provides a means for biased frictional engagement to secure the device 10 in the as used mode as depicted into a tailpipe 202. The exhaust gasses pass through the adapter 40 and into the intake pipe 12 where preferred operation of the device 10 is employed as previously described. It must be noted that alternatively the adapter 40 can be permanently engaged to the intake pipe 12 of the device 10 such as by welding.

Figure 10:
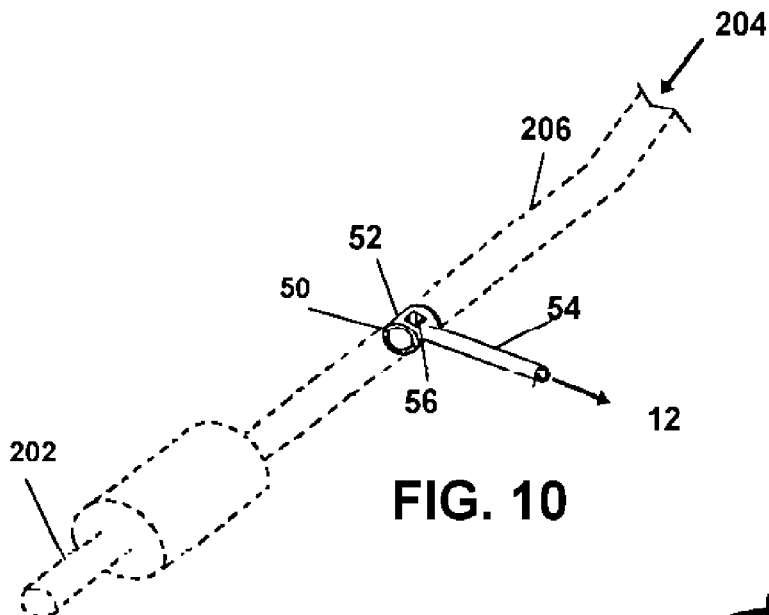
FIG. 10 is an elevated view of yet another particularly preferred mode of the device wherein an adaptive element is positioned at an intermediate location on a vehicle exhaust system.

In FIG. 10 is shown yet another particularly preferred mode the device 10 including an additional adaptive element 50 with an operative means of engagement to an intermediate position on a vehicle exhaust system 206 between the engine head 204 and tailpipe/muffler 202. The means of engagement can be permanent such as welding, or removable such as bolt type engagement. The adapter 50 in this mode includes a pipe body portion 52 that is positioned coaxially aligned with the conventional exhaust pipe 206 to allow exhaust gasses to flow normally.

Figure 10A:
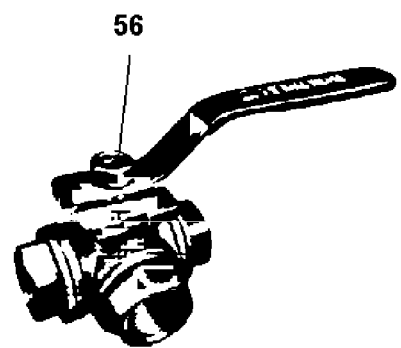
FIG. 10a shows a conventionally known three-way valve to be employed with the switch interface of the mode of the device of FIG. 10.

The adaptive element 50 further includes a switch interface to allow a user to switch the direction of flow of exhaust gasses to the secondary pipe 54 as desired, such as the provision of a three-way valve conventionally known in the art as shown in FIG. 10a. However, the switch interface 56 may be any pipe flow switch valve known in the art as desired within the intended scope of the switch interface 56 as set forth.

Figure 11:
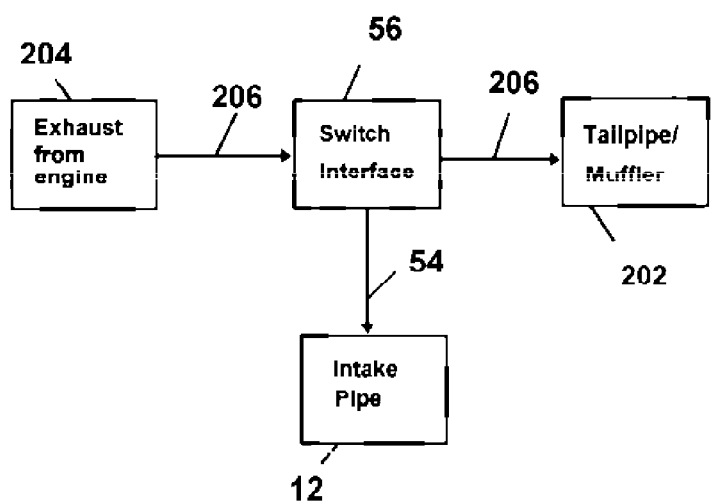
FIG. 11 is a schematic of the particularly preferred mode of the device of FIG. 10.

The secondary pipe 54 is operatively engaged to intake pipe 12 for directing exhaust gasses for operative employment of the device 10 as previously stated. In this mode the secondary pipe 54 may additionally employ the adapter 40 of FIG. 5 to engage the intake pipe 12 of the device 10 to the secondary pipe 54 via the frusto-conical portion 44. FIG. 11 shows a schematic of the preferred mode of the device 10 of FIG. 10.

While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. A burrowing vermin extermination device comprising:
   an intake pipe having an axial conduit communicating between a first end and a second end of said intake pipe;
   means to engage said axial conduit of said intake pipe at said first end to an exhaust port of an internal combustion engine;
   a chamber defined by one or a plurality of sidewalls extending between two ends of said chamber, said chamber engaged to said axial conduit at said second end of said intake pipe;
   means to communicate an additive material which generates smoke or gas when subjected to heat, into said chamber;
   a reservoir having a secondary chamber in communication with said chamber, at a level below that of said chamber;
   said secondary chamber in an alignment with said axial conduit of said intake pipe at said second end;
   said alignment providing a direct communication of exhaust gasses into said reservoir for an enhanced heating of any said additive material therein;
   an exhaust pipe having an axial conduit communicating from a sealed engagement to said chamber at a first end of said exhaust pipe, to a second end of said exhaust pipe;
   a flexible conduit having an internal passage communicating between a first end of said flexible conduit and a second end of said flexible conduit;
   said second end of said exhaust pipe configured for sealed engagement to said first end of said flexible conduit; and
   said second end of said flexible conduit engageable with a burrow entrance whereby exhaust gasses communicated from said internal combustion engine are communicated into said chamber for heating of said additive material and further communicated to said burrow from said second end of said flexible conduit in combination with smoke or gas from said additive material.

2. The burrowing vermin extermination device of claim 1, additionally comprising:
   said intake pipe extending from said first end to said second end thereof in a substantially inverted U-shaped configuration; and
   said inverted U-shaped configuration providing means to prevent said additive material or smoke or gas therefrom from a communication into said exhaust port of said internal combustion engine.

3. The burrowing vermin extermination device of claim 2, additionally comprising:

said exhaust pipe extending from said first end to said second end thereof in an elongated substantially inverted U-shaped configuration; and said inverted U-shaped configuration providing an elongation of said exhaust pipe to provide a means to dissipate heat from said exhaust gasses.

4. A burrowing vermin extermination device of claim 2 wherein said means to engage said axial conduit of said intake pipe at said first end to an exhaust port of an internal combustion engine comprises:

said exhaust port being an engine exhaust port exiting a sidewall on said engine;

a manifold plate engaged to said first end of said intake pipe; and fasteners communicating through said manifold plate and with said sidewall on said engine.

5. The burrowing vermin extermination device of claim 3 additionally comprising:

said inverted U-shaped configuration of said exhaust pipe providing means to prevent additive material from communicating to said flexible conduit.

6. A burrowing vermin extermination device of claim 3 wherein said means to engage said axial conduit of said intake pipe at said first end to an exhaust port of an internal combustion engine comprises:

said exhaust port being an engine exhaust port exiting a sidewall on said engine;

a manifold plate engaged to said first end of said intake pipe; and fasteners communicating through said manifold plate and with said sidewall on said engine.

7. A burrowing vermin extermination device of claim 5 wherein said means to engage said axial conduit of said intake pipe at said first end to an exhaust port of an internal combustion engine comprises:

said exhaust port being an engine exhaust port exiting a sidewall on said engine;

a manifold plate engaged to said first end of said intake pipe; and fasteners communicating through said manifold plate and with said sidewall on said engine.

8. The burrowing vermin extermination device of claim 5 wherein said additive material is oil.

9. The burrowing vermin extermination device of claim 5 wherein said additive material is dry ice.

10. The burrowing vermin extermination device of claim 7 wherein said additive material is oil.

11. The burrowing vermin extermination device of claim 7 wherein said additive material is dry ice.

12. The burrowing vermin extermination device of claim 1, additionally comprising:

said exhaust pipe extending from said first end to said second end thereof in an elongated substantially inverted U-shaped configuration; and said inverted U-shaped configuration providing an elongation of said exhaust pipe to provide a means to dissipate heat from said exhaust gasses.

13. The burrowing vermin extermination device of claim 12 additionally comprising:

said inverted U-shaped configuration providing means to prevent additive material from communicating to said flexible conduit.

14. A burrowing vermin extermination device of claim 12 wherein said means to engage said axial conduit of said intake pipe at said first end to an exhaust port of an internal combustion engine comprises:

said exhaust port being an engine exhaust port exiting a sidewall on said engine;

a manifold plate engaged to said first end of said intake pipe; and fasteners communicating through said manifold plate and with said sidewall on said engine.

15. A burrowing vermin extermination device of claim 13 wherein said means to engage said axial conduit of said intake pipe at said first end to an exhaust port of an internal combustion engine comprises:

said exhaust port being an engine exhaust port exiting a sidewall on said engine;

a manifold plate engaged to said first end of said intake pipe; and fasteners communicating through said manifold plate and with said sidewall on said engine.

16. A burrowing vermin extermination device of claim 1 wherein said means to engage said axial conduit of said intake pipe at said first end to an exhaust port of an internal combustion engine comprises:

said exhaust port being an engine exhaust port exiting a sidewall on said engine;

a manifold plate engaged to said first end of said intake pipe; and fasteners communicating through said manifold plate and with said sidewall on said engine.

17. The burrowing vermin extermination device of claim 1 wherein said additive material is oil.

18. The burrowing vermin extermination device of claim 1 wherein said additive material is dry ice.

* * * * *